United States Patent [19]
Bucke et al.

[11] Patent Number: 4,587,119

[45] Date of Patent: May 6, 1986

[54] METHOD OF REDUCING DENTAL PLAQUE FORMATION WITH PRODUCTS FOR HUMAN OR ANIMAL CONSUMPTION USING ISOMALTULOSE SUCROSE SUBSTITUTE

[75] Inventors: Christopher Bucke; Peter S. J. Cheetham, both of Reading, England

[73] Assignee: Tate & Lyle Public Limited Company, England

[21] Appl. No.: 682,567

[22] Filed: Dec. 14, 1984

Related U.S. Application Data

[63] Continuation of Ser. No. 391,498, Jun. 24, 1982, abandoned, which is a continuation-in-part of Ser. No. 201,463, Oct. 28, 1980, abandoned.

[30] Foreign Application Priority Data

Nov. 7, 1979 [GB] United Kingdom ............... 7938562

[51] Int. Cl.⁴ ............... A61K 31/70; A61K 9/68; A23G 3/00; A23G 3/30
[52] U.S. Cl. ............................ 424/48; 424/49; 426/3; 426/548; 426/549; 426/579; 426/590; 426/615; 426/658; 426/660; 514/53
[58] Field of Search ............... 424/180, 49, 48; 426/3, 426/548, 590, 658, 660, 549; 514/53

[56] References Cited

U.S. PATENT DOCUMENTS

| | | | |
|---|---|---|---|
| 4,117,173 | 9/1978 | Schweck | 426/548 |
| 4,217,413 | 8/1980 | Walon | 426/658 X |
| 4,556,429 | 12/1985 | Takazoe et al. | 127/30 |

FOREIGN PATENT DOCUMENTS

| | | |
|---|---|---|
| 2344252 | 6/1975 | Fed. Rep. of Germany . |
| 57-58852 | 3/1982 | Japan . |
| 57-72910 | 5/1982 | Japan . |
| 2086203 | 5/1982 | United Kingdom . |

OTHER PUBLICATIONS

Sharpe et al., Formation of Isomaltulose in Enzymatic Dextran Synthesis, J. Org. Chem. 25 (1960), pp. 1062–1063.

Primary Examiner—Donald B. Moyer
Assistant Examiner—C. Joseph Faraci
Attorney, Agent, or Firm—Ostrolenk, Faber, Gerb & Soffen

[57] ABSTRACT

Isomaltulose is of use as a whole or partial replacement for sucrose in products for human or animal consumption.

2 Claims, No Drawings

METHOD OF REDUCING DENTAL PLAQUE FORMATION WITH PRODUCTS FOR HUMAN OR ANIMAL CONSUMPTION USING ISOMALTULOSE SUCROSE SUBSTITUTE (RELATED APPLICATION)

This application is a continuation of U.S. Ser. No. 391,498, filed 6/24/82, now abandoned, which is a continuation in part of U.S. Ser. No. 201,463 filed 28 Oct. 1980, now abandoned.

The present invention is concerned with the preparation of food and related products, and in particular with the use of a certain material as a total or partial substitute for sucrose in the preparation of food and other products intended for human or animal consumption.

Sucrose, otherwise known simply as 'sugar', is obtained from sugar beet and from sugar cane, with sugar cane representing on a world-wide basis the more important source. Sucrose is a unique substance of great versatility, possessing not only in itself an exceptional combination of organoleptic and related properties but also being able to contribute significantly to the properties of manufactured foods such as confectionery, jams, cakes and biscuits. Furthermore, there is a strong and increasing separate demand for the use of sucrose as a feedstock for fermentative and chemical processes.

Currently in the United Kingdom, about half of the sucrose sold is bought as sucrose by the consumer for domestic use. Most of the remaining sucrose is used by food and related manufacturers, and the fermentation and chemical industries take only about 5% of the total sucrose. It will readily be appreciated that in the fermentation and chemical industries, sucrose is principally employed as a chemical or biochemical substrate and is converted into compounds different from sucrose itself. Thus, in producing beer or wine, sucrose is sometimes used as a fermentation supplement for yeasts, while for example to produce surfactants the sucrose is esterified with fatty acid groups.

The use of sucrose as a feedstock or reagent in fermentative processes and chemical processes thus has little in common with the other uses of sucrose, being based as it is on the biochemical or chemical properties of sucrose. With the present invention, we are not concerned with providing a sucrose substitute of use in the manner of a chemical reagent as a substrate for conversion in the fermentative and chemical industries. Rather, we are concerned with a sucrose substitute of use as an ingredient in the preparation of foods and related products. As mentioned, sucrose is a unique substance and it is not possible to provide a single substance which can act as a substitute for sucrose in all the instances where sucrose is used.

In the food and related industries, use is being made of the ability of sucrose to impart organoleptic, structural or other properties to a product for human or animal consumption. Such properties include, for example, taste, bulk, mouthfeel, texture, body, and other directly perceived effects, as well as ancillary properties such as preserving action or formation of structure. It is these and kindred properties of sucrose which we aim to match or modify with our sucrose substitute. As a simplification, we will therefore use the term "ingredient" as an indication that we are concerned with a sucrose substitute for use as an ingredient in the preparation of food or other products for human or animal consumption. By the term 'ingredient' we exclude use in the chemical or fermentative industries for the production of sucrochemicals or of beer, wine or other alcoholic drink.

Thus, our invention concerns itself with an ingredient for use in place of sucrose in manufactured or domestically-produced foods such as confectionery, cakes, biscuits and jams; beverages and soft drinks; and in pharmaceuticals which are orally administered, as well as in concentrates such as syrups or powders employed to manufacture the foods or other products. By definition, our sucrose substitute is not for use in the chemical industry in the preparation of for instance detergents, nor is it for use in the fermentative industry in the preparation of alcoholic drinks.

About one third of the sucrose used industrially in the United Kingdom to manufacture foods is employed in the manufacture of chocolate and other confectionery, followed by cakes and biscuits (around 15%), then jam and preserves, and also soft drinks (both about 10%), and then in a miscellany of products, ranging from canned vegetables and fruit to pickles and sauces or frozen foods. Some sucrose is also used by the pharmaceutical industry in producing pharmaceutical compositions to make them more platable.

It is the bulk provided by sucrose which, in addition to the sweetness and ready solubility in water, forms the basis for the large manufacturing use of sucrose in chocolates and confectionery. Indeed, it is the bulk and other characteristics of sucrose, aside from its sweetness, which are major factors in its utility, and to some extent the sweetness can be a disadvantage. Thus, for instance, sucrose is a valuable preservative but necessarily sucrose contributes sweetness to condensed milk, jams and petfoods which embody this preservative action. In some products, one would like to be able to raise the sucrose level without imparting additional, over-sweetness.

For these and other reasons, there have been efforts to develop substitutes for sucrose. Where bulk and texture is relatively unimportant, the high potency sweeteners such as saccharin or cyclamate might be of use. However the use of both saccharin and cyclamate has met with opposition, especially in view of their alleged carcinogenic effects. Other substances are being developed as high potency sweetening agents, but even if they are formulated with bulking aids and other additives, it is unlikely they will form a complete substitute for sucrose in the manufacture of foods, pharmaceuticals and like products taken into the human or animal mouth.

Other sucrose substitutes such as glucose, maltose, and maltodextrins are principally obtained through hydrolysis of starch, with the end-product glucose showing promise and meeting with consumer acceptability. Nevertheless, glucose is not ideal in all respects, and there is still a need for a sucrose substitute which when used as an ingredient can match some of the characteristics of sucrose or glucose and yet which possesses other beneficial characteristics unique to itself.

We have now unexpectedly discovered that a certain compound known as isomaltulose possesses properties which make it suited for use directly as an ingredient in total or partial replacement of sucrose in the preparation of foods, pharmaceuticals and other products intended to be taken into the human or animal mouth. As will become apparent, this finding was particularly surprising in view of the industrial use of isomaltulose as a chemical intermediate in the preparation of another sweetening agent.

Isomaltulose is a reducing disaccharide which is sometimes known as palatinose. It has the structure

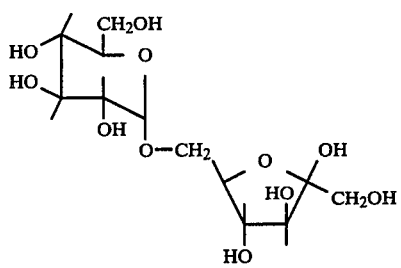

and is more systematically known as 6-O-(α-D-glucopyranosyl)-D-fructofuranose.

Historically, isomaltulose was first mentioned in a 1952 article (J. Amer. Chem. Soc. 74,3202 (1952)) as a by-product of a fermenting micro-organism, *Leuconostoc mesenteroides*. Subsequent work published in 1956 and 1960 (respectively, J. Amer. Chem. Soc. 78, 2514 (1956) and J. Org. Chem 25, 1062 (1960)) confirmed the formation of isomaltulose as a by-product of dextran synthesis from sucrose by *L. mesenteroides*.

Isomaltulose was also found during a German study of bacterial contamination occurring in a sugar factory; see the articles by Silvia Lorenz in Z. Zuckerind. (1958) 8 at 490-494 and 535-541, particularly the second article at pages 539 and 540. Lorenz found that one infecting bacterium, *Protaminobacter rubrum* strain 12, was converting sucrose in raw sugar juice into a disaccharide shown to have the structure given above.

The bacterial conversion of sucrose to isomaltulose by *P. rubrum* was the subject of German Patentschrift No. 1049800 in the name of the Suddeutsche Zucker-Aktiengesellschaft. It was later discovered that other bacteria may be used to effect the conversion of sucrose to isomaltulose, and in their UK Patent Specification No. 1429334 (which corresponds to German Patentschrift No. 2217628), the same company mention that *Serratia plymuthica* is also suitable.

The UK Patent Specification No. 1429334 is itself directed to the preparation of isomaltitol (α-D-glucopyranosyl-1,6-sorbitol) from isomaltulose by a catalytic hydrogenation. In practice the hydrogenation gives a mixture that also contains α-D-glucopyranosyl-1,6-mannitol; this mixture is available as a low calorie sweetener under the trade name 'Palatinit'.

More recently, in their European Patent Specification No. 0001099, Bayer Aktiengesellschaft describe a process for continuous fermentation of micro-organisms, e.g. *Protaminobacter rubrum* or *Serratia plymuthica*, with simultaneous conversion of sucrose to isomaltulose. Again the isomaltulose is being prepared for hydrogenation to give the low calorie sweetener product.

The hydrogenation of isomaltulose to low calorie sweeteners appears to be the only practical use made of the compound.

We have now found that isomaltulose itself has a combination of properties, largely unforseeable, which make it suitable as an ingredient for formulation into compositions for human or animal consumption.

It has often been a disadvantage of sucrose-containing products that there are economic and other considerations which prevent re-formulation. We have unexpectedly discovered that isomaltulose can be used as a total or partial replacement for sucrose and yet contribute similar mouthfeel, bulk, structure, body, preservation, and other desirable properties as does sucrose. The crystallinity, solubility in water (46 g/100 ml) and other physical properties (for example mp 118°–122° C., equilibrium relative humidity 25 to 32% water at 80% and 22° C.) make isomaltulose a satisfactory replacement for sucrose, without the same amount of sweetness being imparted.

In accordance with the present invention, we employ isomaltulose as an ingredient in the formulation of ingestible or oral products for human or animal use.

Ingestible products are those which are intended to be swallowed, and include manufactured or domestically-produced food such as confectionery, for instance fudge, toffee and other candies or sweets; baked foods, for instance cakes, pastries and biscuits; preserves, for instance, jams, marmalades and fruit conserves; frozen products, for instance ice-cream, frozen desserts and other frozen foods; canned products, for instance fruit canned in syrup; bottled, steamed, poached and other cooked foods not otherwise mentioned; non-alcoholic drinks or beverages., and other foods previously made with sucrose, as well as orally-administered ingested pharmaceutical compositions. Oral compositions are those taken into the mouth but not intended to be ingested as such, for instance toothpastes, tooth powders, mouth washes, gargles, dental lotions and chewing gums.

Also provided by the invention are liquid or solid pre-mixes and concentrates for use in preparing ingestible or oral products. Such pre-mixes and concentrates include liquid concentrates, for instance flavoured syrups for dilution to give drinks, and also include solid pre-mixes, for instance cake pre-mixes for mixing with milk and/or eggs or other available ingredient to give a cake mix.

We have determined that isomaltulose has some physical properties similar to those of sucrose, though it does have reduced sweetness (37% that of sucrose sweetness at 7% w/v).

Surprisingly, we found that isomaltulose has less readily quantifiable properties which make it especially suited as an ingredient in place of sucrose.

Thus, in general, isomaltulose is particularly useful in preparing cooked foods, whether by baking, boiling or other heat treatment. When using isomaltulose in cooking, the resultant cooked product often has a richness of taste and developed flavour which is more pronounced than obtained when using sucrose. These improvements arise presumably because the isomaltulose has not dominated the taste sensation and has allowed other ingredients to exert a more pronounced organoleptic effect. We have noticed this effect particularly with products which contain flavouring essences or some fruit or nuts, for instance jams, tinned fruit, cakes. With jams and related products such as conserves, marmalades, it is significant to note that isomaltulose does give a setting point.

Additionally, isomaltulose has less tendency to give grainy products, as for instance sometimes occurs with sucrose in meringues. Especially with baked products such as cakes, isomaltulose often gives a lighter, more voluminous texture particularly suited to sponge cakes and like products.

Furthermore, isomaltulose can be used as a bulking agent to impart bulk without strong sweetness.

Isomaltulose, in direct contrast to sucrose, is a reducing sugar and can impart colour more readily than does sucrose. Total or partial replacement of sucrose by isomaltulose in the ingredients for cakes, biscuits and other baked products readily leads to a darker, often more attractive product. Similar considerations apply to the use of isomaltulose in fudge, humbugs, and candies in general.

Particularly surprising is our discovery that isomaltulose can be used to form toffee and related confections. Sucrose undergoes complex physical and chemical changes during the making of toffee, and other common saccharides can not be used. However, we have been able to make isomaltulose toffee without any difficulty.

The particular mix of chemical, physical, organoleptic and related properties possessed by isomaltulose thus give a particularly favourable material for use as a sucrose substitute. The precise blend of properties is not possessed by other sugars, even closely related sugars. For example, the isomer maltulose is a relatively sweet material which appears to be available only as a relatively impure syrup.

In general terms, when proceeding in accordance with the present invention, isomaltulose can be used as a whole or partial replacement of sucrose in conventional formulations, due allowance being made for the difference in sweetness.

Ideally the isomaltulose will be 100% pure, as may be obtained from repeated crystallization of the material prepared by enzymatic conversion of sucrose using, for example, the bacterial process described in German Patenschrift No. 1049800, UK Patent Specification No. 1429334 or European Patent Application No. 0001099. However, we find that satisfactory results can be obtained using the once-crystallized material. Thus, in practice, the isomaltulose can be impure, containing up to 10%, 20% or even higher percentage of other saccharides and accompanying matter. Furthermore, crystallization may not be necessary where the isomaltulose can be added as a solution.

In the specification of our patent application entitled "Production of Isomaltulose" which also claims a priority date of 7 Nov. 1979, (Ser. No. 201,462), we have described a novel process using immobilized isomaltulose-forming enzyme systems to convert sucrose. The immediate product of this process is an isomaltulose solution also containing sucrose and by-products. Simple crystallization by conventional concentration and cooling procedures can be used to obtain crystals in 90% or higher content of isomaltulose. Such crystals are particularly suited to use in the present invention.

For some uses, replacement of sucrose with an equal weight of a mixture of isomaltulose and sucrose may be desired, particularly where the product is to retain characteristic sweetness. On the other hand, replacement of sucrose with an equal weight of isomaltulose alone may be preferred where less sweetness is wanted, for example in toothpastes. As a corollary, the reduced sweetness of isomaltulose permits use of a greater amount of isomaltulose to impart bulk, etc, without producing an over-sweet product.

Isomaltulose has been used as an alternative for isomaltose in in vitro studies of isomaltose adsorption ("Some Recent Advances in Inborn Errors of Metabolism" Proceedings of Fourth Symposium of the Society for the Study of Inborn Errors of Metabolism held in Dublin, July, 1966, published as a book in 1968 by E. and S. Livingston, Ed Hold and Coffey, at page 106 in the paper by Holzel on Disaccharide Intolerances). As a result of the clinical studies, it appears that isomaltulose is readily hydrolyzed by an enzyme complex in the human intestine and that the constituent monosaccharides (fructose and glucose) are adsorbed, metabolized and otherwise behave as fructose and glucose derived from sucrose.

Preliminary studies indicate that although isomaltulose is metabolized by Streptococcus mutans (the bacterium present in the oral cavity and believed to cause dental caries), no dental plaque is formed thereby. There are thus good reasons for believing isomaltulose to be non-cariogenic (that is, a compound which does not induce formation of dental caries).

This belief is reinforced by the findings reported in Scand J Dent Res 1980, 88, 201-209 by K. R. Roberts and M. L. Hayes. Anaerobic suspensions of fresh plaque were treated with solutions of various sugars, to see if the sugar was metabolized to acid. The production of acid would then indicate a risk of caries formation in the mouth. Among other tested sugars, it was found that palatinose (that is, isomaltulose) gave no acid production, indicating non-cariogenicity. Further support for our belief of non-cariogencity is to be found in UK Patent Application No. 2,086,203 published on 12 May 1982 and claiming a low-cariogenic sweetener comprising sucrose and palatinose, with the palatinose serving to reduce cariogenicity in the combination.

Thus, the use of isomaltulose in products for human consumption has the further advantage of not increasing the cariogenicity. Indeed, substitution of isomaltulose for sucrose or other cariogenic material leads to a reduction in cariogenicity, with attendant benefits.

In summary, the present invention resides in the use of isomaltulose as an ingredient in the preparation of products for human or animal consumption. It does not reside in the use of isomaltulose as a chemical reagent, nor does it reside in the use of isomaltulose in the production of beer or wine. The use of isomaltulose in the production of beer or wine has already been proposed in German Auslegeschrift No. 2344252, though in this prior proposal it is important to note that the isomaltulose is not being used as a substitute for sucrose.

The present invention is illustrated by the following non-limiting examples.

In these examples, the isomaltulose is crystalline material which is at least 90% pure and which has been prepared by the process of example 1 in the specification of the said patent application entitled "Production of Isomaltulose". Isomaltulose produced by other methods can be used instead.

EXAMPLE 1

Toffee Humbugs were made as follows:

| Ingredients | Amount (parts by weight) |
| --- | --- |
| Isomaltulose | 185 |
| Butter | 23 |
| Water | 57 |
| "Golden Syrup" (Registered Trade Mark for a partially inverted refined cane sugar syrup) | 4 |
| Cream of tartar (potassium tartrate) | 1 |

-continued

| Ingredients | Amount (parts by weight) |
| --- | --- |
| Vanilla essence | 1 |

With the exception of the potassium tartrate and vanilla essence, the ingredients were placed in a saucepan and heated until the isomaltulose had dissolved. The potassium tartrate was then added and the mixture brought to the boil at 143° C. The resulting viscous liquid was much darker than was obtained when using sucrose instead of isomaltulose.

The vanilla essence was added and the mix poured onto a greased heat-proof surface. In the conventional manner, the edges of the toffee were then turned over to the middle and the toffee pulled until a good sheen developed and the product began to harden. The hardening mass was cut with scissors into humbug shapes.

The cooled humbugs were well-formed and retained the pleasant dark colour of the molten mix, and had an equally enjoyable taste.

EXAMPLE 2

Shortcake biscuits were prepared as follows:

| Ingredient | Amount (parts by weight) |
| --- | --- |
| Caster Sugar | 10.9 |
| Isomaltulose | 4.7 |
| Margarine | 31.5 |
| Skim milk | 6.3 |
| Flour (plain) | 46.9 |

The margarine was rubbed into the flour using an electric mixer, then the caster sugar and isomaltulose were added, and lastly the milk.

The mix was rolled out to approx 0.5 cm thickness, cut into rounds and cooked at 205° C. for 15–20 minutes.

The shortcake biscuits made with isomaltulose had an improved colour, texture and richness of taste when compared with shortcake biscuits made using 4.7 parts of sucrose instead of the isomaltulose in the above recipe.

EXAMPLE 3(a)

Low sweetness marzipan, with improved flavour, was prepared as follows:

| ingredient | Amount (parts by weight) |
| --- | --- |
| Egg yolk | 13.3 |
| Ground almonds | 33.3 |
| Icing sugar | 6.7 |
| Isomaltulose | 43.3 |
| Water | 3.3 |

The ground almonds, sucrose and isomaltulose were mixed together using an electric mixer, then the egg yolk and water were mixed in.

This marzipan had a very pleasant taste and texture. The sweetness was reduced (as compared with an all-sucrose marzipan) and this meant that the almond flavour came through more strongly. It was also slightly drier than an all-sucrose marzipan, and this made it less cloying to taste.

EXAMPLE 3(b)

Reduced sweetness marzipan, with improved flavour, was prepared as follows:

| Ingredient | Amount (parts by weight) |
| --- | --- |
| Ground almonds | 33.3 |
| Icing sugar | 20 |
| Isomaltulose | 30 |
| Egg yolk | 13.3 |
| Water | 3.3 |
| | 100 |

Marzipan was prepared as for Example 3(a).

This recipe gave a slightly sweeter marzipan than Example 3(a), but it was not as sweet as an all-sucrose marzipan, and had a better colour and texture.

EXAMPLE 4(a)

Toffee was prepared as follows:

| Ingredient | Amount (parts by weight) |
| --- | --- |
| Isomaltulose | 63.5 |
| Butter | 8 |
| Water | 19.9 |
| "Golden Syrup" | 8 |
| Potassium tartrate | 28 |
| Vanilla essence | q.s.* |

*sufficient amount

All of the ingredients except the potassium tartrate and vanilla essence were heated in a saucepan until the isomaltulose had dissolved. The cream of tartar was added, and the mixture was boiled to 290° F.

The essence was added and the mixture poured onto a well-greased heatproof surface and "pulled" until the toffee had a good sheen and was beginning to harden.

The isomaltulose mixture had a much darker colour than sucrose toffee and since it was much less sweet, the vanilla flavour and butter taste came through much more.

EXAMPLE 4(b)

Toffee was prepared as for Example 4(a), but instead of using 63.5 pts isomaltulose, 30 pts sucrose and 33.5 pts isomaltulose were used.

This gave a toffee with a nice creamy flavour and good sweetness. The toffee was quite brittle—not chewy.

EXAMPLE 4(c)

Toffee was prepared as for Example 4(a) but instead of using 63.5 pts of isomaltulose, 127 pts. of isomaltulose was used.

This gave a chewy toffee, with a rich dark colour and a caramel flavour.

EXAMPLE 5

Meringues were prepared as follows:

| Ingredient | Amount (parts by weight) |
| --- | --- |
| Egg White (fresh) | 30.5 |
| Isomaltulose | 69.5 |

The egg white was whipped, using electric whisk, then the isomaltulose was folded in. 2 to 3 cm diameter meringues were piped onto baking trays and cooked at 65° C. for 1.5 hours.

These meringues were crisp and golden-brown, and had a nice caramel taste. (Similar meringues made with sucrose are white, very sweet and have a 'grainy' texture, as the sugar usually does not dissolve).

EXAMPLE 6(a)

Vanilla puddings were made using the recipe below:

| Ingredient | Amount (parts by weight) |
| --- | --- |
| Isomaltulose | 1.06 |
| Milk (fresh) | 88.69 |
| Icing sugar | 6.39 |
| Dextrose | 3.19 |
| Tetra-sodium pyro-phosphate | 0.1596 |
| Di-sodium ortho-phosphate | 0.1596 |
| Calcium lactate | 0.1064 |
| Colour | q.s. |
| Vanilla flavour | q.s. |
| K-carrageenan | 0.1419 |

All of the ingredients were mixed together using an electric mixer, and then poured into small dishes.

This pudding had slightly lower sweetness and improved flavour as compared with a similar pudding made with only sucrose, extra sucrose replacing the isomaltulose.

EXAMPLE 6(b)

Vanilla pudding was prepared as for Example 6(a), but instead of using the 1.06 parts isomaltulose and 6.39 pts icing sugar and 3.19 pts dextrose, 5.32 pts isomaltulose and 3.192 pts icing sugar and 2.128 pts dextrose were used.

This gave a pudding of good texture, sweetness and vanilla flavour.

EXAMPLE 7

Sponge cakes were prepared as described below:

| Ingredient | Amount (parts by weight) |
| --- | --- |
| Cake flour | 23.32 |
| Dried egg powder | 4.33 |
| High ratio fat | 8.22 |
| Milk powder | 2.33 |
| Antelope cream powder | 0.91 |
| Bicarbonate of soda | 0.49 |
| Water | 30.20 |
| Isomaltulose | 30.20 |

All of the dry ingredients except the isomaltulose were mixed together, then mixed with the fat. The isomaltulose was mixed in, then the water. The mixture was poured into a baking tin and cooked at 175° C. for 30 minutes.

Sponge cake prepared as above has a darker colour than sucrose sponge, and much lower sweetness. The volume and texture of the cake were good (i.e. similar to sucrose sponge).

EXAMPLE 8

Toppings and fillings for bakery products were prepared as follows:

| Ingredient | Filling (1) | Filling (2) | Topping (1) | Topping (2) |
| --- | --- | --- | --- | --- |
| Fat (with emulsifier) | 33.9 | 29.2 | 19.5 | 12.4 |
| Water | 10.1 | 9.7 | 8.9 | — |
| Isomaltulose | 42.4 | 58.3 | 70.8 | 74.6 |
| Milk powder | 4.24 | 2.4 | 0.885 | — |
| Glucose | 8.5 | — | — | — |
| Salt | 0.265 | 0.304 | — | — |
| Evaporated milk | — | — | — | 13.0 |

The ingredients for each topping or filling were mixed together for several minutes using an electric mixer.

These fillings and toppings had greater volume and lower sweetness than similar ones made with sucrose.

EXAMPLE 9

French nougat was prepared as follows:

| Ingredient | Amount (parts by weight) |
| --- | --- |
| Whole blanched almonds-browned | 11.4 |
| Angelica-chopped | 5.7 |
| Glace cherries-chopped | 5.7 |
| Isomaltulose | 45.4 |
| Powdered glucose | 22.7 |
| Water | 0.71 |
| Egg Whites | 8.0 |
| | 100 |

The isomaltulose and glucose were heated with the water until dissolved. The egg whites were beaten stiffly then added, and the mixture was beaten until it was very thick. The angelica, nuts and cherries were added and mixed in well. The whole mixture was poured into a tin, and a weight put on top, and left to set for 12 hours.

The isomaltulose nougat had lower sweetness and greater bulk than a similar nougat made with sucrose.

EXAMPLE 10

Canned fruit (pears) were prepared as follows:

Pears were peeled by hand, quartered and the cores removed. Because of possible discolouration, the pears were quickly submerged in dilute salt solution (1%) before packing into cans. The cans were filled with a 'light' syrup comprising in parts by weight:

Isomaltulose 16 parts
Water 84 parts

The can ends were clinched and the cans exhausted at about 85° C. for 10 minutes before sealing, then processed at 90° to 95° C. for 20 minutes and finally cooled.

On tasting, the pears with isomaltulose were found to have a more intense pear flavour than pears canned with a sucrose syrup of the same concentration. The isomaltulose syrup was considerably less sweet than the equivalent sucrose syrup, but there was no noticeable difference in the texture of the pears canned in isomaltulose and sucrose syrups.

EXAMPLE 11

Plum Jam was prepared as follows:

| Ingredient | Amount (parts by weight) |
| --- | --- |
| Victoria plums | 45 |
| Isomaltulose | 22 |
| Sucrose | 23 |

| Ingredient | Amount (parts by weight) |
| --- | --- |
| Water | 10 |
| | 100 |

The plums were halved and stoned, then stewed for 1 hour in the water. The sucrose and isomaltulose were added and the mixture was stirred, and then left to boil without stirring until the temperature was 104° C.

The jam was then poured into hot glass jars and sealed.

This jam had a lower sweetness than a similar jam made with only sucrose, so more of the plum flavour came through. The texture was also better, as the jam was thicker and richer. There was no visible evidence of bacterial spoilage after storage for 6 weeks.

EXAMPLE 12

Toothpaste was prepared by a conventional mixing procedure, using the following ingredients:

| Ingredient | Amount (parts by weight) |
| --- | --- |
| Calcium phosphate (abrasive) | 40.0 |
| Isomaltulose | 20.4 |
| Glycerine | 10.2 |
| Sodium coconut monoglyceride sulphonate | 0.80 |
| Sodium carboxymethyl cellulose | 1.2 |
| Sodium coconut alkyl sulphate (20% active) | 2.3 |
| Sodium fluoride | 0.22 |
| Artificial sweetener saccharin | 0.20 |
| Flavour | 0.90 |
| Green urea-formaldehyde agglomerates | 0.65 |
| Water and minor ingredients | balance to 100 |

The resultant product was fully comparable with conventional toothpastes and was suited for packaging in aluminium tubes.

EXAMPLE 13

Chewing gum with a balanced flavour was made in the usual way, but using the following ingredients:

| Ingredient | Amount (parts by weight) |
| --- | --- |
| Polyvinyl acetate | 20 |
| butyl phthalylbutyl glycolate | 3 |
| Polyisobutylene | 3 |
| isomaltulose | 10 |
| microcrystalline wax | 2 |
| calcium carbonate | 2 |
| peppermint flavour | 1 |
| saccharin | 0.15 |

The gum was given a light dusting of sugar before packaging.

EXAMPLE 14

Lemonade was made by firstly mixing the following ingredients:

| Ingredient | Amount (parts by weight) |
| --- | --- |
| lemon essence | 0.8 |
| citric acid | 1.7 |
| sodium benzoate | 0.16 |
| water | to 100 |

The resultant solution was then used to prepare the lemonade drink by addition of 45 parts by weight of isomaltulose, 50 parts by weight of sucrose, 0.1 parts by weight of saccharin and sufficient carbonated water to reach 1000 parts by weight.

The lemonade had a pleasant taste, with a noticeable mouthfeel and bulked flavour.

OTHER EXAMPLES

In a similar manner, and by substituting isomaltulose for sucrose in conventional recipes, we have also prepared poached pears, coconut ice (a confection), fudge, orange squash, shortbread, scones, orange jelly, lemon sorbet, vanilla ice cream and other products. On each occasion, there was no difficulty in producing a product similar to the conventional product, through sometimes with modified taste or other characteristics. Generally the isomaltulose products were markedly less sweet. For some products, e.g. the ice cream, a better taste was obtained by using a mixture of sucrose and isomaltulose. For the ice cream, sorbet, and scones, a product of greater volume was obtained. Overall, the conclusion was that isomaltulose behaved most satisfactorily as a sucrose substitute.

EXPERIMENTS ON CARIOGENICITY

Preliminary studies were carried out to assess the cariogenicity, if any, of isomaltulose.

0.1 ml of a vortex-mixed overnight culture of a standard laboratory stock of *Streptococcus mutans*, strain C67-1, serotype c, which is cariogenic in rodents, was inoculated into seven sets of tubes each containing 10 ml Streptococcal Basal Medium (de Stoppelaar) of the following composition:

| | gram/liter |
| --- | --- |
| dipotassium hydrogen phosphate | 4 g |
| potassium dihydrogen phosphate | 1 g |
| sodium chloride | 2 g |
| Difco bacto-casitone | 20 g |
| Difco yeast extract | 5 g |
| pH | to 7.0 |

For the seven sets of tubes, the following additions were made:

A: control, no addition  E: 5% isomaltulose/5% sucrose
B: 2.5% sucrose  F: 7.5% isomaltulose/2.5% sucrose
C: 5% sucrose  G: 10% isomaltulose
D: 10% sucrose Each set comprised three replicate tubes closed with rubber stoppers fitted with glass rods immersed to the same depth in the medium. The cultures were incubated at 37° C. under anaerobic conditions (95% hydrogen/5% $CO_2$). At 24 h intervals the rods were transferred to fresh tubes of the same medium, seven such transfers being made. After each transfer, the pH of the spent broth was measured. After the final incubation period, the deposits on the rods were gently washed with sterile quarter-strength Ringer solution, scraped and washed off into aluminium foil cups and dried in vacuo for dry weight determination. The medium was centrifuged, the supernatant retained for determination of acid by titration and the pellet dried for weight determination after washing as above. After weighing, the dried bacteria from the rods and the media were pooled and hexose and protein contents determined after dissolution in hot NaOH.

Results were subjected to a one-way analysis of variance and significances of differences tested by a multiple range test.

After the seven transfers to fresh tubes, the value for the control set A fell from an initial pH of 7.2 to 6.98 and the value for the sucrose sets B, C, and D fell to 4.06, 4.09 and 4.14, respectively. The isomaltulose media, sets E, F, and G, fell to 4.20, 4.27 and 4.27, respectively. This favourable difference in pH fall was equally reflected in the results up to the last transfer.

As an indication of biomass, the dry weights in mg for the seven sets A to G were, respectively, 2.5, 49.3, 51.7, 29.2, 16.3, 12.7, and 11.1. This encouraging result was borne out by the measured protein production, respectively, 0.8, 8.4, 8.8, 6.3, 3.5, 3.5, and 3.5 for A to G.

Polysaccharide production also provided a guide to potential cariogenicity. For A to G, the total hexose was assayed at 0.1, 37.1, 40.0, 18.1, 8.2, 5.0, and 2.6 mg, respectively.

CONCLUSIONS (i) Isomaltulose does not appear to encourage growth of *S mutans* and there is some evidence that the presence of isomaltulose may inhibit growth in sucrose. *S mutans*, which was not adapted to sucrose before the start of the experiment, appeared from the pH curves to be able to grow and produce acid in all combinations of sugar over the 24 h periods available. However, although in 10% isomaltulose the eventual yield was significantly greater than in medium with no added sugar, the yield was depressed in sucrose/isomaltulose mixtures compared with the sucrose-only controls (cf E with B; F with C), whether dry weight or protein is taken as an index of biomass.

(ii) Over 24 h periods, the pH fall is inhibited by the presence of isomaltulose but acid production seems to be not significantly affected. However, it seems highly probable that acid production by this organism in the mouth would be low, as it would be exposed to the sugar for only brief periods. After 7 days of serial transfer, there were significant differences in pH level. The results of Roberts and Hayes op cit suggest that plaque bacteria ferment isomaltulose very slowly. The present results, indicating relatively large acid yields (either total or per unit weight) are presumably dependent on the long incubation periods and would not necessarily reflect events in the mouth following brief exposure of plaque bacteria to ingested isomaltulose. The results with sugar mixtures suggest that, over 24 h the presence of isomaltulose at 50 or 75% substitution levels does not interfere significantly with acid production from sucrose.

(iii) Polysaccharide production is inhibited by the presence of isomaltulsoe in mixtures with sucrose and at high levels of substitution there is reduced adhesion. Measurement of total hexose served to assay both intracellular polysaccharide and insoluble extracellular polysaccharide. Polysaccharide production was significantly reduced in the presence of isomaltulose compared to the controls (cf F with B and E with C). It is possible that the main effect of isomaltulose is to reduce the amount of intracellular polysaccharide (IPS) and this may be important in relation to long-term pH conditions in plaque, as IPS is the main source of fermentable carbohydrate in the absence of dietary sugars in between-meal periods.

We claim:

1. In a method for reducing dental plaque formation in the oral cavity caused by *Streptococcus mutans* in combination with a nonalcoholic, sucrose-containing product for human or animal consumption, the improvement which comprises substituting isomaltulose for at least a portion of the sucrose in said product, thereby reducing the formation of the dental plaque.

2. The method of claim 1, wherein said isomaltulose is 1.06 to 74.6 weight percent of said product.

* * * * *